(12) United States Patent
Turner et al.

(10) Patent No.: US 7,469,176 B2
(45) Date of Patent: Dec. 23, 2008

(54) VEHICLE CONTROL SYSTEM FOR TRAVERSING OBSTACLES

(75) Inventors: Marcus Turner, Coventry (GB); Ian Hulme, Leamington Spa (GB)

(73) Assignee: Land Rover, Warwickshire (GB)

( * ) Notice: Subject to any disclaimer, the term of this patent is extended or adjusted under 35 U.S.C. 154(b) by 770 days.

(21) Appl. No.: 10/869,743

(22) Filed: Jun. 16, 2004

(65) Prior Publication Data

US 2005/0283289 A1 Dec. 22, 2005

(51) Int. Cl.
*G06F 19/00* (2006.01)
(52) U.S. Cl. .............................. 701/41; 701/1
(58) Field of Classification Search ............... 701/36, 701/41–44; 180/6.2, 6.24, 6.6; 342/70–71; 477/1; 475/18; 340/425.5, 436
See application file for complete search history.

(56) References Cited

U.S. PATENT DOCUMENTS

| 5,479,173 A | | 12/1995 | Yoshioka et al. | |
| 6,014,595 A | * | 1/2000 | Kobayashi | 701/1 |
| 6,017,101 A | | 1/2000 | Matsuda | |
| 6,018,308 A | | 1/2000 | Shirai | |
| 6,095,277 A | * | 8/2000 | Bohner et al. | 180/403 |
| 7,162,333 B2 | * | 1/2007 | Koibuchi et al. | 701/1 |

FOREIGN PATENT DOCUMENTS

| GB | 2344326 | 6/2000 |
| JP | 2000128007 | 5/2000 |
| JP | 2002222574 | 8/2002 |

* cited by examiner

*Primary Examiner*—Yonel Beaulieu
(74) *Attorney, Agent, or Firm*—Price, Heneveld, Cooper, DeWitt & Litton, LLP

(57) ABSTRACT

A vehicle control system includes an active steering system having a steerable wheel defining a steering angle and a steering wheel defining an input control angle. The steering system further includes a coupler component, a actuator component, a controller component and a sensory component. The components are interconnected such that the controller component can selectively vary the steering angle relative to the input control angle. The steering angle defines a desired path. The sensor component detects a first vehicle operating parameter indicating that the vehicle is off road and a second vehicle operating parameter indicating that the vehicle has encountered an object preventing the vehicle from traveling along the desired vehicle path. The controller component is adapted to oscillate the steerable wheel when the sensor component detects that the vehicle is off road and has encountered an object preventing the vehicle from traveling along the desired path.

15 Claims, 3 Drawing Sheets

VEHICLE CONTROL SYSTEM FOR TRAVERSING OBSTACLES

BACKGROUND OF THE INVENTION

The present invention relates to a motor vehicle, and in particular to an active front steering system for a motor vehicle.

Active front steering systems for motor vehicles are used to rotate the wheels of the vehicle at a rate that is independent from the rotation of the steering wheel of the vehicle or without rotation of the steering wheel. The ratio of the rotation of the steering wheel to the rotation of the wheel defines a steering ratio. The active front steering system therefore sets the steering ratio of the vehicle. Without the active front steering system, the steering ratio is typically only determined by the ratio set by the mechanical connections between the steering wheel and the wheel of the vehicle.

Heretofore, active front steering systems have included a powered actuator operably connected to a pinion of a rack-and-pinion system of a vehicle. The active front steering system assists in pivoting the steerable wheels. In basic operation, the active front steering system typically alters (either positively or negatively) a driver input control angle from the driver as applied to the steering wheel, via the powered actuator, to rotate the wheels according to the steering ratio.

During off road operation, obstacles may be encountered by a vehicle. If the obstacle is sufficiently large and/or the friction generated by the tire is sufficiently low, the wheel will be unable to climb over the object. Such obstacles impede vehicle progress and may cause difficulty in controlling the vehicle.

SUMMARY OF THE INVENTION

One aspect of the present invention is a vehicle control system including an active steering system having a steerable wheel defining a steering angle and a steering wheel defining a driver input control angle. The active steering system further includes a coupler component, an actuator component, a controller component and a sensory component. The components are operably interconnected such that the controller component can selectively vary the steering angle relative to the driver input control angle. The steering angle defines a desired vehicle path. The sensor component is configured to detect at least a first vehicle operating parameter indicating that the vehicle is off road, and to detect at least a second vehicle operating parameter indicating that the vehicle has encountered an object preventing the vehicle from traveling along the desired vehicle path. The controller component is adapted to oscillate the steerable wheel when the sensor component detects that the vehicle is off road and has encountered an object preventing the vehicle from traveling along the desired path.

Another aspect of the present invention is a motor vehicle including a chassis, a power train, and a vehicle control system. The chassis includes at least one steerable wheel defining a steering angle, and the power train includes an engine and a transmission coupled thereto. The vehicle control system includes a controller and an active system coupled to the controller. The steering system includes a steerable wheel defining a steering angle and a steering wheel providing a driver input control angle. The active steering system further includes a coupler component, an actuator component, a controller component, and a sensor component. The components of the active steering system are operably interconnected such that the controller is adapted to selectively vary the steering angle relative to the driver input control angle. The steering angle defines a desired vehicle path. The sensor component is adapted to detect a vehicle operating parameter indicating that the vehicle has encountered an object preventing the vehicle from traveling along the desired vehicle path. The controller component oscillates the steerable wheel when the vehicle has encountered an object.

Yet another aspect of the present invention is a vehicle control system including an active steering system. The active steering system includes a steerable wheel having a steering angle defining a desired direction, an actuator operably coupled to the steerable wheel for powered steering thereof, and a controller adapted to the actuator to steer the steerable wheel. The vehicle control system also includes at least one sensor adapted to sense a vehicle operating parameter indicating that an object has been encountered. The controller selectively varies the steering angle if an object is encountered.

These and other features, advantages, and objects of the present invention will be further understood and appreciated by those skilled in the art by reference to the following specification, claims and appended drawings.

DETAILED DESCRIPTION OF THE PREFERRED EMBODIMENTS

For purposes of description herein, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
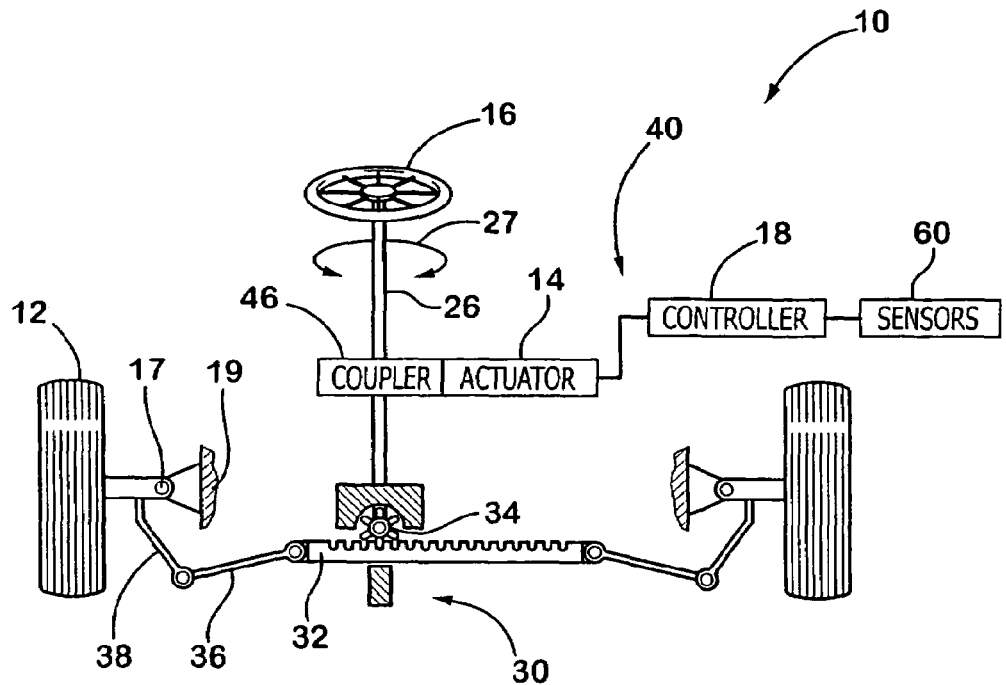
FIG. 1 is a partially schematic view of a steering system embodying the present invention, wherein a steering angle is 0°.
Figure 2:
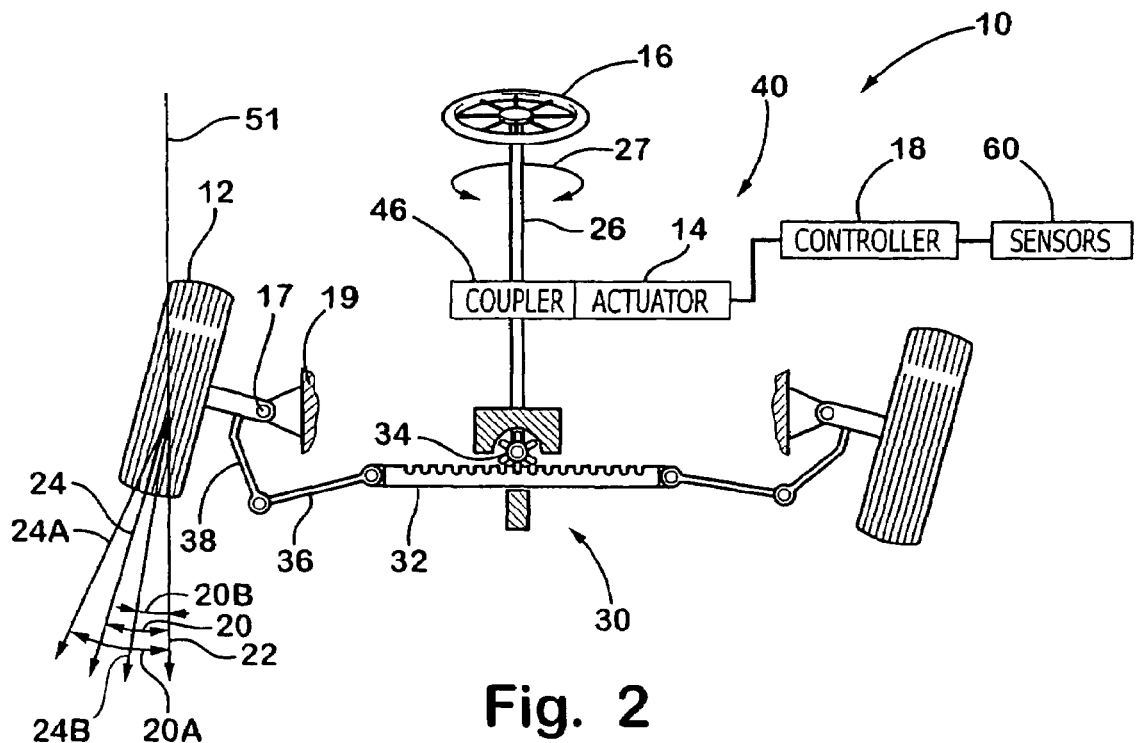
FIG. 2 is a partial schematic view of the steering system pivoted to a non-zero steering angle.

Referring to FIG. 1, reference number 10 generally designates a steering system for a motor vehicle embodying the present invention. In the illustrated example, the steering system 10 comprises a steerable wheel 12 defining a steering angle 20 (see FIG. 2), a powered actuator 14 controlling the steering angle and a steering wheel 16 providing a driver input control angle. The ratio of the driver input control angle to the steering angle defines a steering ratio. The steering system 10 also includes a controller 18 for selectively varying the steering ratio based, at least in part, upon road conditions.

In the illustrated example, the steering system 10 includes a pair of the steerable wheels 12 that pivot about a pivot point 17 with respect to a vehicle frame 19. Each wheel defines the steering angle 20 (FIG. 2) between the longitudinal axis 22 of the associated vehicle and a central travel axis 24 of each wheel 12. It should be noted that while the steering angle 20 is defined by the pivotal movement of each of steerable wheels 12, the steering angle 20 may be defined by pivotable rear wheels if the vehicle is so equipped, and/or any other pivotable wheels.

The illustrated steering system 10 also includes a steering column 26 rotatable in a direction represented by an arrow 27, and operable to receive the driver input control angle from an operator of the vehicle via the steering wheel 16. The steering column 26 is operably linked to the steerable wheels 12 via a rack-and-pinion system 30 that includes a rack 32 and a pinion gear 34, a pair of drag links 36, and a steering arm 38. Although the present example utilizes a rack-and-pinion steering system, it should be noted that other steering systems compatible with the steering system 10 described herein may be utilized.

The steering system 10 further includes a basic active front steering system 40 that includes the controller 18 in operable communication with the powered actuator 14. The powered actuator 14 is operably connected to the rack 32 of the rack-and-pinion system 30 via a coupler 46. The active front steering system 40 assists in pivoting the steerable wheels 12. Although a particular kind of active front steering system is described herein, other systems known in the art my be utilized. In basic operation, the active front steering system 40 augments the driver input control angle from the driver as applied to the steering wheel 16, via the powered actuator 14. The steering angle 20 as defined by the steerable wheel 14 is determined by a combination of the driver input control angle and an additional steering angle supplied by the powered actuator 14. The additional steering angle supplied by the powered actuator 14 is determined by the following equation:

$$\alpha_{ASA} = \delta_{DICA}((R_A - R_D)/R_D);$$

wherein $\alpha_{ASA}$=the additional steering angle supplied by the powered actuator 14, $\delta_{DICA}$=the angle change of the steering wheel 16 as determined by the driver input steering angle, $R_A$=the steering ratio of the vehicle without the additional steering angle and $R_D$=the desired steering ratio. For example, if the steering ratio of the steering system 10 without the powered actuator 14 is 1 (e.g., turn the steering wheel 16 five degrees and the steerable wheel 12 will turn five degrees), the desired steering ratio is 5 (i.e., slow change of the steering angle 20 of the steerable wheel 12 compared to the change of angle of the steering wheel 16) and the steering wheel 16 has moved five degrees, the powered actuator 14 will move the steerable wheel 12 negative four degrees. Therefore, the steering wheel 16 will rotate five degrees and the steerable wheel 12 will rotate one degree, thereby providing the vehicle with a steering ratio of 5.

Figure 3:
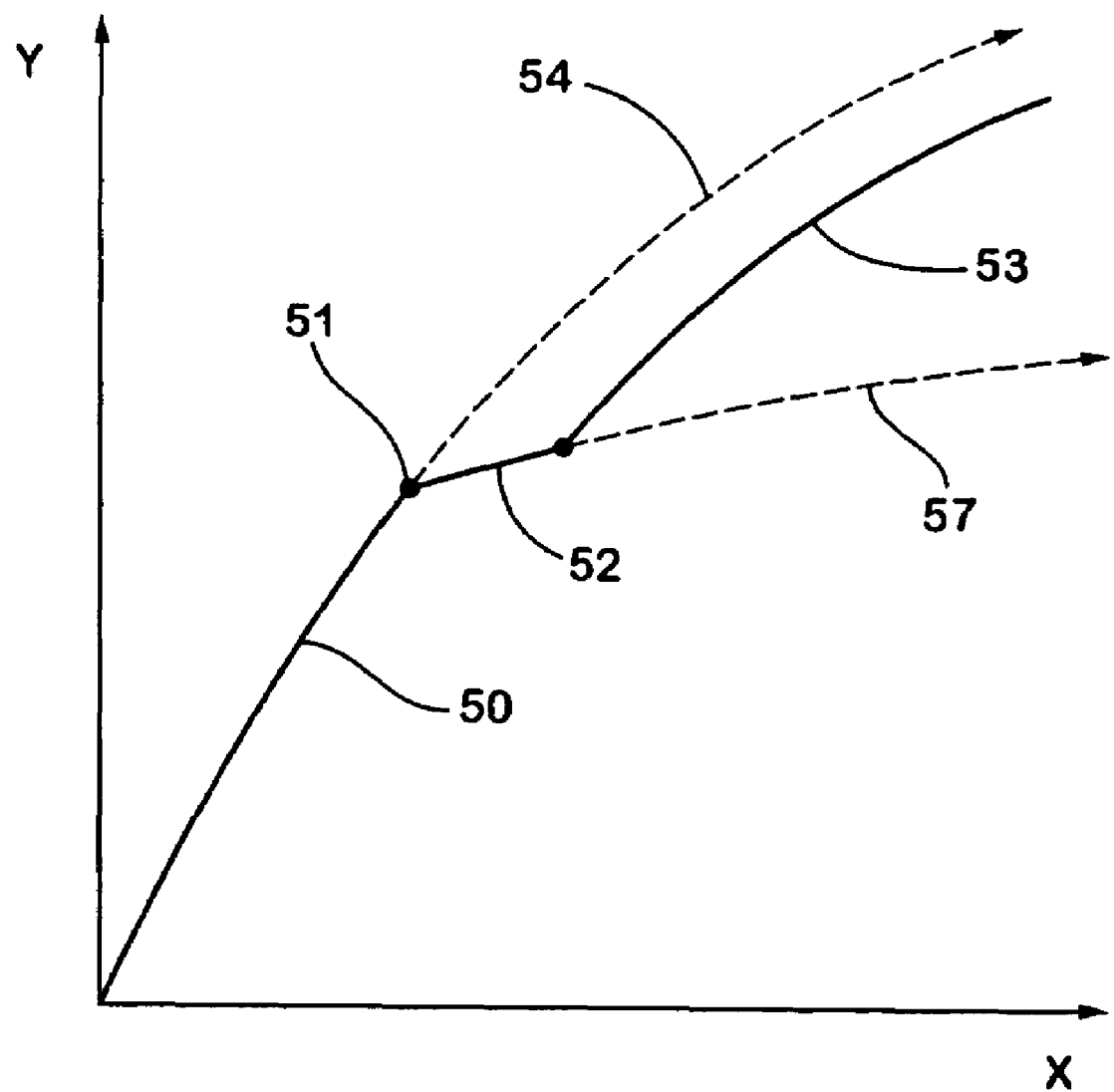
FIG. 3 is a graph illustrating the direction of vehicle travel.

With further reference to FIG. 3, during off road operation a vehicle will generally travel along a first portion 50 of a desired path. The desired path is the direction of travel that the operator of the vehicle desires. If sufficient traction is available, the desired path 50 may be determined by the steering angle 20 of the steerable wheels 12 either by itself or in conjunction with other driver input control parameters. If the vehicle encounters an object 51, and there is insufficient traction to maintain the direction of travel along the desired path 50, the vehicle will generally move in a direction of an undesired path 52, or may stop completely. The controller 18 evaluates the output of sensors 60 (FIGS. 1 and 2) corresponding to various vehicle operating parameters and compares the operating parameters to the driver input parameters to determine if the vehicle has reached a condition where it does not have sufficient grip to continue traveling along the desired path 50.

The operating parameters measured by the sensors 60 could include suspension deflection, as well as wheel slip, vehicle velocity and accelerations. The vehicle velocities and accelerations could include both linear displacements in the XYZ directions, as well as rotation (e.g. pitch, roll, and yaw). Once the controller 18 has utilized the information from the sensors 60 to determine that an object has been encountered, the controller 18 then determines if the driver wants the vehicle to continue down the desired path. To determine if the driver wants to continue down the path, the sensors provide information concerning the clutch, throttle and gear settings, the torques in the drive line, as well as other control signals on the vehicle, such as DSC, ABS or ACE.

Figure 4:
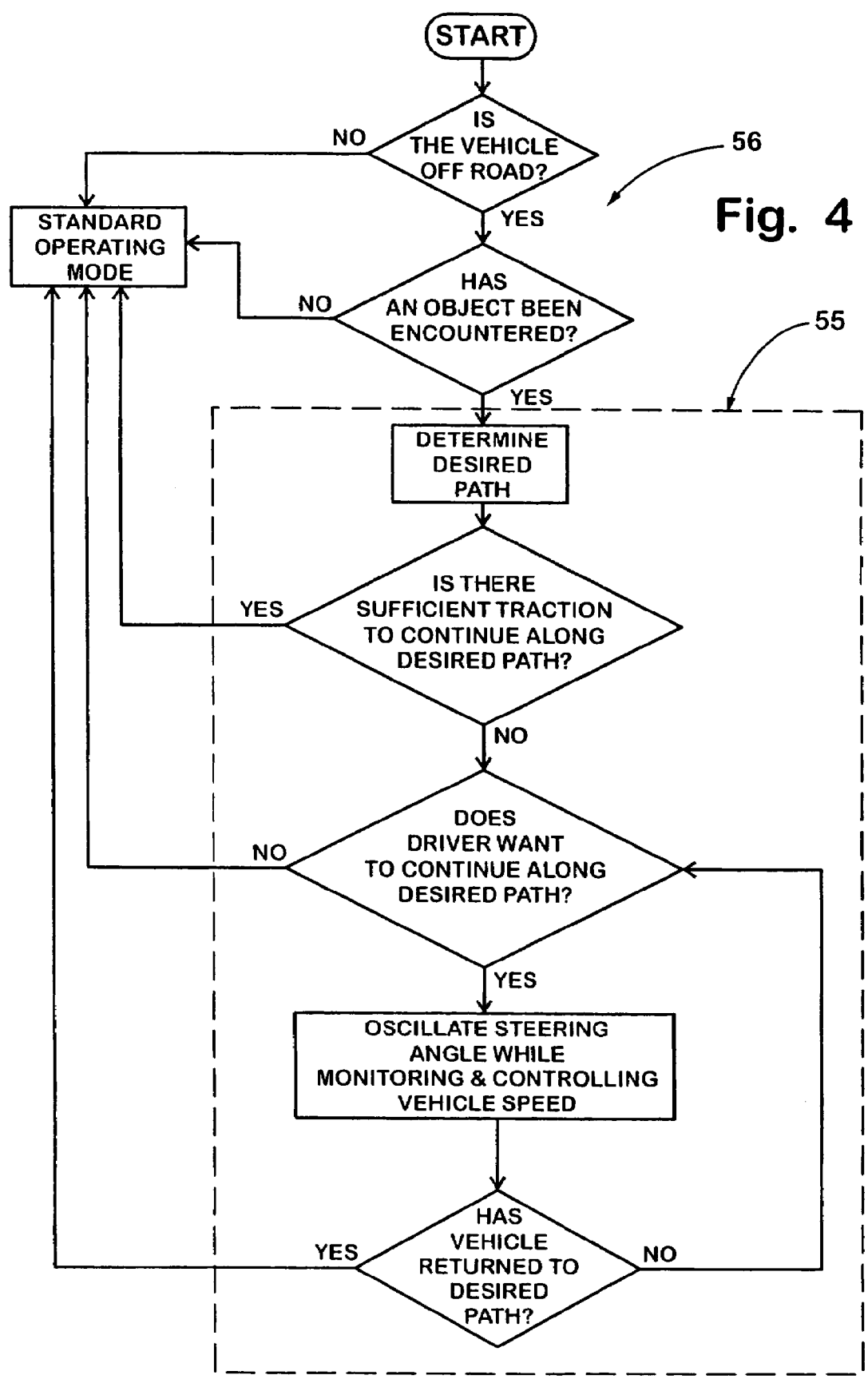
FIG. 4 is a flow chart illustrating the process for controlling the vehicle control system according to the present invention.

With further reference to FIG. 4, if the controller 18 determines that the vehicle is off road, and that an object has been encountered, the controller goes into an object avoidance mode illustrated generally by the portion of the flow chart 56 enclosed by the dashed lines 55. If the controller 18 determines that the driver wants to continue along the desired path 50, the controller oscillates the steerable wheel to locate in easier path, or to increase grip by using the sidewalls of the tires or an alternative face or surface portion of the obstacle. During oscillation of the steerable wheels 12, the controller will generally vary $\alpha_{ASA}$ at a preselected frequency and magnitude between positive and negative values. Although the precise manner of the oscillations could vary depending upon the particular application and road conditions, in a preferred embodiment $\alpha_{ASA}$ varies sinusoidally at a preselected frequency and magnitude. Thus, with reference to FIG. 2, although the steering wheel 16 may be stationary at a driver input control angle nominally corresponding to the central travel axis 24 of wheel 12 at nominal steering angle 20, the actual, momentary angle of the wheel 12 will oscillate about the axis 24 between the maximum momentary travel axis 24A, and a minimum momentary travel axis 24B. Similarly, the steering angle will vary between the maximum angle 20A and minimum angle 20B. For example, the controller 18 may be programmed to vary the steering angle 20 by +/−5° about the nominal steering angle 20. However, it is anticipated that the oscillation magnitude could be greater in one direction if the sensors 60 determine that an asymmetrical oscillation is required to maintain the vehicle on the desired path 50. For example, the controller 18 could oscillate the steerable wheels 12 at +5° and 0° relative to the nominal steering angle 20 to increase the amount of steering angle provided at the steerable wheels 12 relative to the input control angle provided by the driver. Also, the magnitude and frequency of the oscillation may be varied depending upon the vehicle speed, co-efficient of friction and wheel slippage, and the like.

As illustrated in FIG. 3, upon encountering the object 51, the vehicle is temporarily forced off the desired path 50 along a portion of an undesired path 52. Upon actuation of the object avoidance mode by the controller 18, the vehicle returns to a second portion of the desired path 53. Although the second portion 53 of desired path may be displaced slightly from the original desired path 54, the "new" desired path 53 is substantially closer to the original desired path 54 than if the vehicle had continued along the undesired path 57 due to encountering the object.

To determine that the vehicle is driving in an off road condition, various vehicle operating parameters may be monitored and evaluated. Examples of methods to determine if the vehicle is off road include determining low speed differences between the vehicle response and driver inputs, both in terms of lateral response and longitudinal response. Detection of low tire and/or road friction at high temperatures may also be utilized. Also, large wheel travel differential may be detected to determine if the vehicle is off road. In order to avoid an erroneous determination that the vehicle is off road upon encountering a curve, the controller 18 may make the determination only if a predetermined number of large wheel travels have occurred within a predetermined time period. Yet another method for determining that the vehicle is in off road condition may include detecting road roughness by use of accelerometers in conjunction with the vehicle speed. Still further, in all wheel drive vehicles, sensors may determine if the differential lock condition or low ratio gear box is actuated, and thereby determine that an off road condition is present. Alternately, dynamic low frequency wheel loads, roll bar deflections. ACE logic signals, air suspension logic, DSC signals, engine management signals, GPS signals, and/or a driver setting an on/off road switch may all be utilized to determine if an off road condition is present.

To determine if the vehicle has encountered an object, such that it can no longer continue along a desired path, the vehicle ABS or traction control can be utilized to detect low speed wheel slip. Alternately, the detection of low speed, high magnitude longitudinal acceleration oscillation at a particular frequency may also be utilized to indicate that an object has been encountered. Also, suspension travel sensors may be utilized to determine if the wheel position is changed, or returned to the same positions under large wheel travel situations. Also, a manual switch that is actuated by the driver may be utilized by the controller 18 to determine that an object has been encountered. Alternately, optical sensors on the vehicle or GPS signals may also be utilized to determine that an object has been encountered.

As illustrated in FIG. 4, the vehicle will normally operate in the standard operating mode. However, the controller 18 continuously monitors to determine if the vehicle is off road and whether or not an object has been encountered. If the vehicle is off road, and an object has been encountered, the controller will go into the object avoidance mode 55. The controller 18 will then determine the desired path, and then determine if there is sufficient traction to continue along the desired path. If there is sufficient traction, the controller 18 will return to the standard operating mode. Alternately, if there is insufficient traction to continue along the desired path, the controller will then determine if the driver wants to continue along the desired path. If the driver does not want to continue along the desired path, the controller returns to the standard operating mode. Alternately, if the driver wants to continue along the desired path, the controller 18 oscillates the steering angle while monitoring and controlling vehicle speed in the manner described above. If the vehicle has returned to the desired path, the controller returns to the standard operating mode. Alternately, if the vehicle is still not on the desired path, the controller returns to the step of determining if the driver wants to continue along a desired path.

In addition to oscillating the steering angle upon encountering an object in an off road condition, the controller 18 may also utilize sensors 60 that are connected to the vehicle ABS or traction control system to actively limit wheel slip during oscillation of the wheels. Also, the system may include a manual switch that is operable by the vehicle operator such that the controller 18 does not go into the object avoidance mode even if the vehicle is off road and an object has been encountered. Alternately, the manual switch may include a position that would cause the controller 18 to go into the object avoidance even if the vehicle is not off road and/or an object has not been encountered. Also, although the controller 18 preferably goes into the object avoidance mode only if off road and an object has been encountered, the controller 18 could be configured to go into the object to avoidance mode upon encountering an object, regardless of whether or not the vehicle is off road.

In the foregoing description, it will be readily appreciated by those skilled in the art that modifications may be made to the invention without departing from the concepts disclosed herein. Such modifications are to be considered as included in the following claims, unless these claims by their language expressly state otherwise.

We claim:

1. A vehicle control system, comprising:
an active steering system including a steerable wheel defining a steering angle and a steering wheel defining a driver input control angle, said active steering system further including a coupler component, an actuator component, a controller component, and a sensor component, said components operably interconnected such that said controller component can selectively vary said steering angle relative to said driver input control angle, said steering angle defining a desired path;
said sensor component configured to detect at least a first vehicle operating parameter indicating that the vehicle is off road, and to detect at least a second vehicle operating parameter indicating that the vehicle has encountered an object preventing the vehicle from traveling along said desired path;
said controller component adapted to oscillate said steerable wheel when said sensor component detects that the vehicle is off road and has encountered an object preventing the vehicle from traveling along said desired path.

2. The vehicle control system of claim 1, including:
an active braking system adapted to detect wheel slip, said controller component oscillating said steerable wheel when the vehicle is off road and wheel slip is detected.

3. The vehicle control system of claim 2, wherein:
said controller component monitors the wheel slip while said steerable wheel is oscillating to determine an optimum steering angle having maximum traction, said controller component setting said steerable wheel at said optimum angle.

4. The vehicle control system of claim 3, wherein:
said controller component is adapted to monitor and control vehicle speed using an engine management system of a vehicle.

5. The vehicle control system of claim 1, wherein:
said oscillation of said steerable wheel defines an object avoidance mode; and
said vehicle control system includes a switch adapted to be manipulated by a vehicle operator to selectively turn said object avoidance mode on and off.

6. The vehicle control system of claim 1, wherein:
said controller component only oscillates said steerable wheel if said vehicle is traveling below a predetermined velocity.

7. The vehicle control system of claim 1, wherein:
said controller component determines that an off road condition is present if longitudinal acceleration oscillations above a predetermined value at about a predetermined frequency are present.

8. A motor vehicle, comprising:
a powertrain and a vehicle control system;
said powertrain including an engine and a transmission coupled thereto;
said vehicle control system including a controller and an active steering system coupled to said controller;

said active steering system including a steerable wheel defining a steering angle and a steering wheel providing a driver input control angle, said active steering system further including a coupler component, an actuator component and a sensor component, said components operably interconnected such that said controller is adapted to selectively vary said steering angle relative to said driver input control angle, said steering angle defining a desired path;

said sensor component adapted to detect a vehicle operating parameter indicating that the vehicle has encountered an object preventing the vehicle from traveling along said desired path; and said controller oscillating said steerable wheel when the vehicle has encountered an object.

9. The motor vehicle of claim 8, wherein:
said vehicle has at least four powered wheels, including a pair of steerable wheels, said controller adapted to control the torque to said steerable wheels to control slipping thereof.

10. The motor vehicle of claim 9, wherein:
said motor vehicle includes an active brake system;
said controller providing a signal to said active brake system to control the torque supplied to said steerable wheels.

11. The motor vehicle of claim 8, wherein:
said vehicle control system includes a switch adapted to be manipulated by a driver to selectively prevent said controller from oscillating said steerable wheel.

12. The motor vehicle of claim 8, wherein:
said controller is operably connected to a switch and has an object avoidance mode that is automatically activated when an object is encountered and said switch is in a first position, said switch having a second position wherein said controller does not go into said object avoidance mode even if an object is encountered.

13. The motor vehicle of claim 12, wherein:
said switch has a third position that manually activates said object avoidance mode.

14. The motor vehicle of claim 8, wherein:
said motor vehicle includes at least one pneumatic tire and a system for varying the air pressure within the tire; and
said controller adjusting the air pressure within the tire when the vehicle has encountered an object.

15. The motor vehicle of claim 14, wherein:
said vehicle has at least four pneumatic tires; and
said controller lowers the air pressure in a selected one of said tires if said selected one encounters an object.

* * * * *